(12) United States Patent
Lin et al.

(10) Patent No.: US 7,116,784 B2
(45) Date of Patent: Oct. 3, 2006

(54) METHOD AND APPARATUS FOR AUTHENTICATED REPORTING IN A MOBILE COMMUNICATION DEVICE

(75) Inventors: Jyh-Han Lin, Coral Springs, FL (US); Wei-Hsing Dan Lee, Plantation, FL (US); Ronald R. Smith, Coral Springs, FL (US); Biren Patel, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 269 days.

(21) Appl. No.: 10/261,288

(22) Filed: Sep. 30, 2002

(65) Prior Publication Data

US 2004/0064697 A1    Apr. 1, 2004

(51) Int. Cl.
*H04K 1/00* (2006.01)
*H04L 9/00* (2006.01)
*G06F 15/16* (2006.01)

(52) U.S. Cl. .................. 380/270; 713/168; 726/3; 370/913

(58) Field of Classification Search ........ 713/200–202, 713/150, 168; 380/255, 270; 370/912, 913; 709/227–229
See application file for complete search history.

(56) References Cited

U.S. PATENT DOCUMENTS

| 6,404,388 | B1* | 6/2002 | Sollenberger et al. ...... 342/387 |
| 6,405,241 | B1 | 6/2002 | Gosling et al. |
| 6,421,608 | B1 | 7/2002 | Motoyama et al. |
| 6,944,181 | B1* | 9/2005 | Inoue et al. ................. 370/465 |
| 2002/0069263 | A1* | 6/2002 | Sears et al. ................. 709/218 |

OTHER PUBLICATIONS

Do, "WAP Security: WTLS" May 4, 2001, Secure Telecommunication Systems, p. 1-24.*

* cited by examiner

*Primary Examiner*—Christopher Revak
(74) *Attorney, Agent, or Firm*—Scott M. Garrett

(57) ABSTRACT

A mobile communication device (200) has a software architecture (302) that includes a closed operating environment (306). The closed operating environment is inaccessible to the user of the mobile communication device, and it includes software for implementing a reporting function designed to collect certain information from within the mobile communication device, and to transmit it to an entity outside the mobile communication device, such as a server (310).

14 Claims, 2 Drawing Sheets

METHOD AND APPARATUS FOR AUTHENTICATED REPORTING IN A MOBILE COMMUNICATION DEVICE

TECHNICAL FIELD

This invention relates in general to mobile communication devices, and more particularly to means and methods for acquiring information from a mobile communication device.

BACKGROUND OF THE INVENTION

As mobile communication systems become more widespread, more complex, and more affordable, there is an increasing demand to innovate and provide additional services that are integrated with mobile communication service. Recent developments in mobile communication service include internet access, email, instant messaging, and even networked games among others. Since mobile communication service has become relatively inexpensive, it has become more common for organizations to provide their members with mobile communication devices facilitate more efficient communication. In fact, many organizations and business have come to rely on equipping so many of their members with mobile communication devices that mobile communication service has become a significant operating cost. As such, these organizations and businesses would like to gather usage information to analyze the efficiency of this expense.

One approach to gathering usage information is to provide each mobile communication device with a reporting application that runs in a software operating environment of the mobile communication device. The user of the mobile communication device invokes the application, and the application acquires, gathers, compiles, and formats the desired information as needed. Once the information is collected in the necessary form, it can then be transmitted to an information collecting entity operated by the organization or business. Since many mobile communication devices now have the ability to access the internet and transact information over the internet, via a wireless communication system, the mobile communication device can send the information to a server operated by the organization or business connected to the internet.

In addition to being able to access the internet, many mobile communication devices are now able to load and execute third party applications. Thus, an organization or business could develop its own application to be loaded on the mobile communication devices it gives to its members to perform information gathering. Third parties may even develop software to sell to such organizations and businesses. However, to be useful, the information collected must be authentic. By using an application that resides in what may be referred to as an open operating environment of the mobile communication device, there is the potential that similar applications may be developed to provide false information in the guise of authentic information. Essentially it could allow the user of the mobile communication device to appear to be engaged in an approved activity when the user is in fact engaging in a different activity. Therefore there is a need by which information can be collected from mobile communication devices in a way that ensures the information is authentic.

DETAILED DESCRIPTION OF A PREFERRED EMBODIMENT

Figure 1:
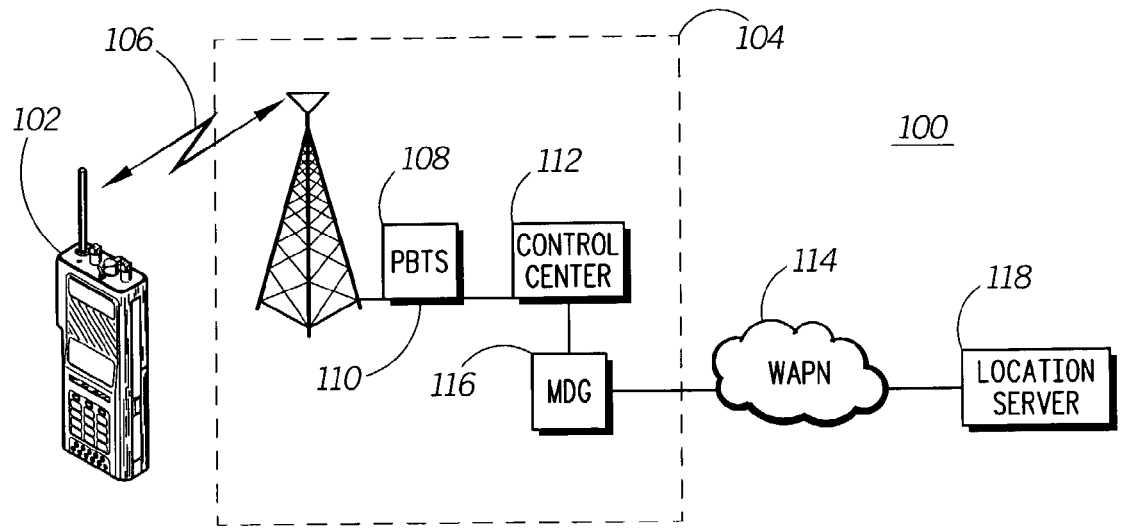
FIG. 1 shows a system diagram of wireless communication system including a mobile communication device for providing authenticated reporting, in accordance with the invention.

While the specification concludes with claims defining the features of the invention that are regarded as novel, it is believed that the invention will be better understood from a consideration of the following description in conjunction with the drawing figures, in which like reference numerals are carried forward.

The invention solves the problem of providing authentic, trusted information by separating the information gathering entity in the mobile communication device from the open operating environment. The operating environment is separated into open and closed operating environments. The open operating environment is the environment where users can load and run application programs of their choice. In contrast, the closed operating environment is not accessible to the user, and any application programs that are invoked and executed there must be installed in the mobile communication device when it is manufactured, such as by placing machine readable code in a proprietary memory device of the mobile communication device. According to the invention, a reporting application program or function is designed and included in the code that will operate in the closed operating environment. The reporting application, in addition to gather the desired information, also establishes a secure communication session with the information gathering entity to securely transfer the information to the information gathering entity. The reporting application can be invoked by an application operating in the open environment, but the information collection and transfer is performed from within the closed operating environment where third party applications operating in the open operating environment cannot change the information, thus ensuring the authenticity of the information.

Referring now to FIG. 1, there is shown therein a system diagram 100 of a wireless communication system including a mobile communication device 102 for providing authenticated reporting, in accordance with the invention. The mobile communication device interfaces with a wireless communication system infrastructure network 104 over an air interface 106. Typically the air interface is established by a base station 108 which establishes a serving area or cell in the vicinity of the base station. The base station includes an enhanced base transceiver 110 which controls and allocates communication resources of the base station, and interfaces with a control network or control center 112. The control center includes typical communication agent processors and switching equipment as known in the art. The infrastructure network also includes a means for connecting to wide area public networks 114, such as a mobile data gateway 116. The mobile data gateway provides data communication service including routing of data as is conventional. The wide area packet network 114 is a large network accessible by the public, such as the Internet. Connected to the wide area packet network is a server 118 for collecting information. The server is an entity connected to the network, and operated by, for example, the organization that owns the mobile communication device 102. The mobile communication device can communicate with the server by establishing a packet data connection, for example, over the air interface 106. The wireless communication system infrastructure then routes information through the mobile data gateway 116. The elements and their functions described so far are similar to presently available equipment, in particular it is very similar to wireless mobile communication systems that provide internet access service for the mobile communication devices that subscribe to such service.

Figure 2:
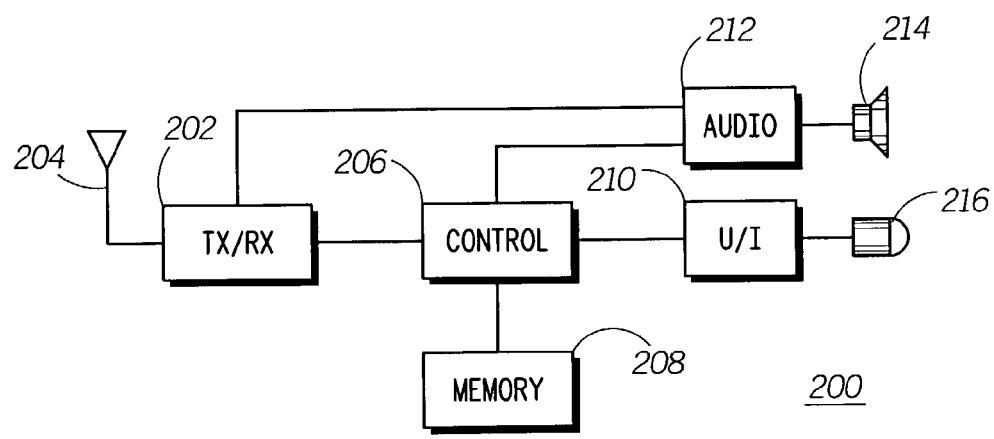
FIG. 2 shows a block diagram of a mobile communication device, in accordance with the invention.

Referring now to FIG. 2, there is shown a block diagram 200 of mobile communication device in accordance with the invention. The mobile communication device is any one of a class of communication devices that permit mobility, such as, for example cellular radiotelephones. It includes a transceiver 202 for modulating and transmitting signals, and for receiving and demodulating signals via an antenna 204. In general the transceiver modulates and demodulates signals according to an air interface established by a wireless or mobile communication system. Both data and voice signals can be sent and received. Data signals may include control messages, as well as packet data communications. In general, there are two modes of communication; circuit data and packet data. Circuit data is used in, for example, voice communication where a circuit is set up between the communicating parties. Packet data is used in data communication, where any loss of data must be guarded against, so packets are occasionally re-transmitted if they are lost or become corrupted. The transceiver is responsive to a controller 206 which operates according to machine readable code stored in a memory or memory means 208. The memory here includes read only memory, random access memory, one time programmable memory, nonvolatile memory, and so on, as needed. The code is referred to as software, and it operates on several different levels as defined by the well known OSI model. The code comprises various algorithms, functions, libraries, and classes for use by the controller in operating the mobile communication device according to a software design specification. One example the software is used for is by the controller to operate a user interface 210, which typically includes a display and keyboard and additional buttons. The mobile communication device also includes an audio processor 212 which functions with the controller and transceiver to process audio and voice signals. Signals received by the transceiver can be played over a speaker 214, and audio signals generated by the user of the mobile communication device can be received at a microphone 216 and processed by the audio processor for delivery to the transceiver. Typically the audio processor digitizes the audio signals received at the microphone in a format such as, for example, pulse code modulation (PCM).

Figure 3:
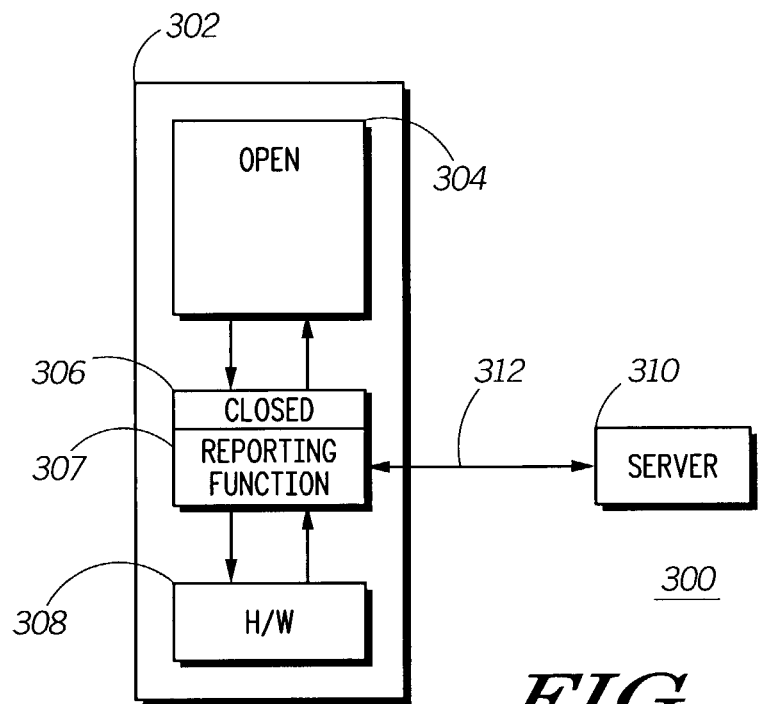
FIG. 3 shows a software operating environment of a mobile communication device in accordance with the invention.

Referring now to FIG. 3, there is shown a software architecture diagram 300 of a software architecture for use in a mobile communication device in accordance with the invention. The software establishes an operating environment or operating system 302. Operating on top of the operating system is an open operating environment 304, a closed operating environment 306, and a hardware interface 308. The software architecture of the mobile communication device may include other software operating entities as needed to implement all the functionality of the mobile communication device. Here, however, the discussion is limited to those software elements necessary to implement the invention for the sake of clarity.

The open operating environment is an operating environment for loading and executing software programs and applications that may be installed after manufacture of the mobile communication device, such as by a user of the mobile communication device. These applications may be developed by third parties. An example of an open operating environment is a Java operating environment in which applets and midlets may be loaded and executed as the user of the mobile communication device desires.

The closed operating environment is designed to be inaccessible to users. Applications meant to be loaded and executed in the closed are provided, for example, at the time of manufacture in a read only memory of the mobile communication device. Generally the closed operating environment prevents a user or other party from altering or substituting code meant to be executed in the closed operating environment. The functionality of a closed operating environment is achieved by, for example, executing the code of a closed application from a read only memory. An example of an application that provides closed operating functionality is a closed Java class. The closed operating environment provides application protocol interfaces to the open operating environment so that applications running in the open operating environment can interact with applications running in the closed operating environment.

According to the invention a closed application for performing a reporting function 307 is provided in the closed operating environment. The reporting function gathers information about operating parameters and other information of the mobile communication device. It may format, sort, perform calculations, compute averages, and so on, as needed, on the desired information. The reporting function may acquire this information by querying memory variables used by other portions of the mobile communication device software or operating code, as well as by querying hardware subsystems 308 of the mobile communication device. Because the reporting function is a closed application, the information it collects is not alterable by an open application, and is therefore authentic and trustworthy.

To report the information to an entity outside the closed operating environment, the reporting function communicates or transmits the information to, for example, a server 310. Generally, an entity outside of the closed operating environment, such as an application operating in the open environment or an entity outside the mobile communication device, requests the information or report. The reporting function is then instantiated, if not already, and collects the desired information. Parameters may be passed to the reporting function via the application protocol interface, indicating specific information to collect, or the reporting function may automatically retrieve specific information, according to design. In a preferred embodiment of the invention, the reporting function establishes a secure connection 312 with the server. The secure connection is performed via a packet data session over the air interface to the wireless communication system infrastructure network, through the mobile data gateway, and over the Internet. The security is achieved via any one of several well known security means, such as secure socket layer, public/private key encryption, client/server authentication, and so on. To accomplish the necessary security, the reporting function interfaces with controller or transceiver, or both, as necessary.

According to a preferred embodiment of the invention, the mobile communication device is provided with a satellite positioning system (SPS) receiver, such as a global positioning system (GPS) receiver. The SPS receiver operates in the hardware domain 308, and provides location information to a location reporting function operating in the closed operating environment. The location reporting function may be invoked by a application operating in the open environment by, for example, the user of the mobile communication device, or by an entity outside of the mobile communication device. The location reporting function acquires present location information, indicating the present location of the mobile communication device, from the SPS receiver.

Figure 4:
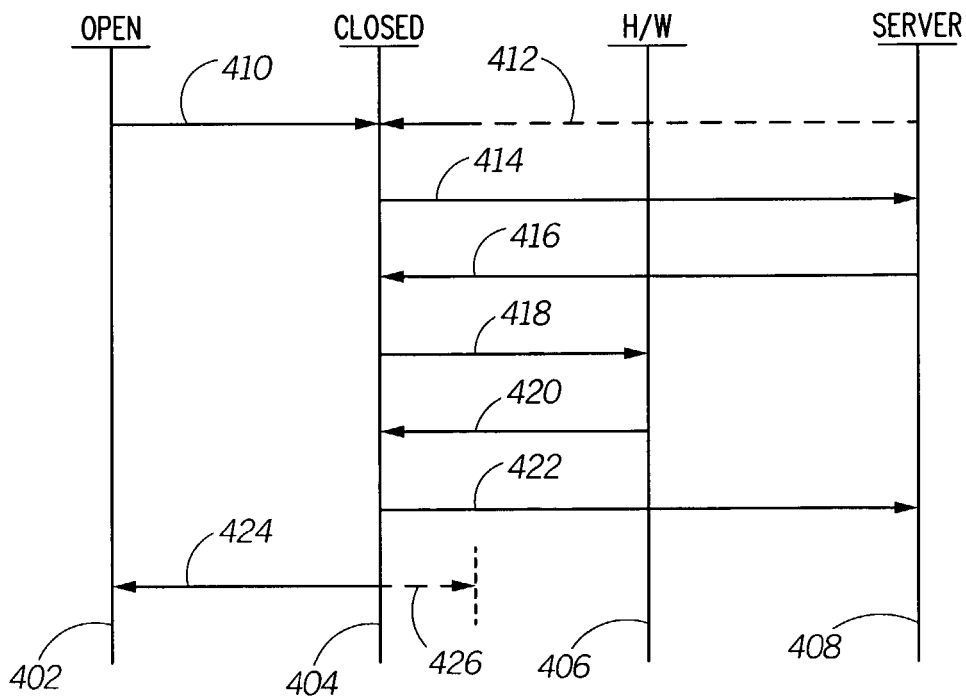
FIG. 4 shows a signal flow diagram of a method for authenticated reporting in a mobile communication device, in accordance with the invention.

Referring now to FIG. 4, there is shown a signal flow diagram 400 of a method for authenticated reporting in a mobile communication device, in accordance with the invention. The diagram shows the relevant flow of signals, message, and information between and among the open operating environment 402, closed operating environment 404, hardware domain 406, and a server 408. The method begins when an entity outside the closed operating environment invokes a reporting function operating in the closed operating environment 404, such as by a message or request 410 from an application operating in the open operating environment, or from an entity outside the mobile communication device via a network message 412 from a server, for example. In the preferred embodiment, a secure connection is negotiated with a server 414, 416. It is alternatively contemplated that a local connection with a computer may be used, in place of a network-located server. In such an instance, it is still preferable that a security means be employed so that the reporting function can verify that the requesting entity is entitled to receive the information if necessary.

Once the reporting function has been invoked, it queries 418 the necessary portions, circuits, memory, and subsystems of the mobile communication device as needed. As a result, information is returned 420 to the reporting function. Once acquired, the reporting function may format or otherwise operate on the information, as needed, and it then transmits 422 the information to the server 408. Accordingly, the information reported to the server is authentic and trustworthy. Finally, the reporting function may report 424 completion of the reporting to the application in the open operating environment, or to some other portion 426 of the mobile communication device.

Thus, the invention provides a method for authenticated reporting in a mobile communication device. The mobile communication device must have a closed operating environment. The method begins by requesting information to be sent to an entity outside the mobile communication device. The requesting is performed by an entity outside of the closed operating environment, and is performed by a message or other signal being passed to an entity operating inside the closed operating environment, such as a reporting function. The reporting function then commences acquiring the information. In order to securely transfer the information, the reporting function, or a software entity working in cooperation with the reporting function commences establishing a secure connection with the outside entity from within the closed operating environment. Once the information has been acquired, and the secure connection established, the reporting function or a software entity working in cooperation with the reporting function commences transmitting the information over the secure connection to the entity outside the mobile communication device. In one embodiment the requesting is performed by an application entity residing in an open operating environment of the mobile communication device. In another embodiment, acquiring the information comprises acquiring location information which corresponds to a present location of the mobile communication device. In another embodiment the requesting is initiated in response to message received from outside the mobile communication device, such as by a server, or a locally connected computer. It is contemplated that the transmitting is performed over an air interface to a wireless communication system infrastructure, the wireless communication system infrastructure in turn routing the information to an internet-connected entity.

The invention also provides for a mobile communication device comprising a transceiver capable of establishing a packet data connection over an air interface with a wireless communication infrastructure network to a data network; a memory means for storing machine readable instruction code for establishing a open operating environment and a closed operating environment. The closed operating environment includes a reporting function that acquires information about the mobile communication device upon receiving a request message, and it also transmits or controls the transmission of the information over the packet data connection in an encrypted form to an entity connected to the network. The open operating environment may include an application program responsive to input received by a user of the mobile communication device for generating the request message. When an application operates with the reporting function, the machine readable code establishes an interface between the closed operating environment and the open operating environment, and specifically to the reporting function.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for authenticated reporting in a mobile communication device, the mobile communication device having a closed operating environment, comprising:
   requesting information of the mobile communication device to be sent to an entity outside the mobile communication device, the requesting being performed by the entity outside of the closed operating environment;
   acquiring the information of the mobile communication device, performed by an entity inside the closed operating environment;
   establishing a secure connection with the entity outside of the closed operating environment from within the closed operating environment; and
   transmitting the information of the mobile communication device over the secure connection to the entity outside the mobile communication device, performed by the entity inside the closed operating environment.

2. A method for authenticated reporting in a mobile communication device as defined in claim 1, wherein the requesting is performed by an application entity residing in an open operating environment of the mobile communication device.

3. A method for authenticated reporting in a mobile communication device as defined in claim 1, wherein the acquiring the information of the mobile communication device comprises acquiring location information, the location information corresponding to a present location of the mobile communication device.

4. A method for authenticated reporting in a mobile communication device as defined in claim 1, wherein the requesting is initiated in response to message received from outside the mobile communication device.

5. A method for authenticated reporting in a mobile communication device as defined in claim 1, wherein the transmitting comprises transmitting the information of the mobile communication device over an air interface to a wireless communication system infrastructure, the wireless communication system infrastructure in turn routing the information to an internet-connected entity.

6. A mobile communication device, comprising:
   a transceiver, the transceiver capable of establishing a packet data connection over an air interface with a wireless communication infrastructure network to a data network;
   a memory means for storing machine readable instruction code, the machine readable instruction code for establishing a open operating environment and a closed operating environment, the closed operating environment including a reporting function that acquires information about the mobile communication device upon receiving a request message, and transmitting the information over the packet data connection in an encrypted form to an entity connected to the network.

7. A mobile communication device as defined by claim 6, wherein the open operating environment includes an application program responsive input received by a user of the mobile communication device for generating the request message, and the machine readable code establishes an interface between the closed operating environment and the open operating environment.

8. A mobile communication device as defined by claim 7, wherein the application program is a Java applet.

9. A mobile communication device as defined by claim 6, wherein the reporting function is a closed Java class.

10. A mobile communication device as defined by claim 6, wherein the mobile communication device further comprises a satellite positioning system receiver, and the information acquired by the reporting function is a present location of the mobile communication device as determined by the satellite positioning system receiver.

11. A mobile communication device as defined in claim 10, wherein the satellite positioning system receiver operates in an assisted mode by receiving assist information through the transceiver, from the wireless communication infrastructure network.

12. A method for authenticated location reporting in mobile communication device, the mobile communication device having a closed operating environment and an open operating environment, comprising:
   requesting location information to be sent to a location server, the requesting being performed by an entity outside the closed operating environment;
   acquiring the location information, performed by a reporting function operating in the closed operating environment;
   establishing a secure connection with the location server, performed by the reporting function, the secure connection being established over a data connection via an air interface with a wireless communication system infrastructure network and subsequently to an internet connection; and
   transmitting the information over the secure connection to the location server.

13. A method for authenticated location reporting as defined in claim 12, wherein the requesting is performed by an application operating in the open operating environment in response to an input by a user of the mobile communication device.

14. A method for authenticated location reporting as defined in claim 12, wherein the requesting is performed in response to a message received at the mobile communication device from the location server.

* * * * *